US012649803B2

(12) United States Patent
Hsieh

(10) Patent No.: US 12,649,803 B2
(45) Date of Patent: Jun. 9, 2026

(54) PREPOLYMER, RESIN COMPOSITION COMPRISING THE SAME AND ARTICLE MADE THEREFROM

(71) Applicant: Elite Material Co., Ltd., Taoyuan City (TW)

(72) Inventor: Chen-Yu Hsieh, Taoyuan City (TW)

(73) Assignee: ELITE MATERIAL CO., LTD., Taoyuan City (TW)

( * ) Notice: Subject to any disclaimer, the term of this patent is extended or adjusted under 35 U.S.C. 154(b) by 588 days.

(21) Appl. No.: 18/302,978

(22) Filed: Apr. 19, 2023

(65) Prior Publication Data

US 2024/0218094 A1 Jul. 4, 2024

Related U.S. Application Data

(60) Provisional application No. 63/434,239, filed on Dec. 21, 2022.

(51) Int. Cl.
*C08F 12/08* (2006.01)
*C08F 4/80* (2006.01)
*C08G 61/08* (2006.01)

(52) U.S. Cl.
CPC ................ *C08F 12/08* (2013.01); *C08F 4/80* (2013.01)

(58) Field of Classification Search
CPC ................................ C08F 12/08; C08G 61/08
See application file for complete search history.

(56) References Cited

PUBLICATIONS

Nishimura et al., "Synthesis of [3.n.3.n.]Paracyclophane Derivatives by Cationic Cyclization of Styrene Derivatives," Tetrahedron Lett., vol. 27, No. 36, pp. 4331-4334, 1986. (Year: 1986).*

* cited by examiner

*Primary Examiner* — Catherine S Branch
(74) *Attorney, Agent, or Firm* — MUNCY, GEISSLER, OLDS & LOWE, P.C.

(57) ABSTRACT

A prepolymer and a resin composition containing the prepolymer are provided. The prepolymer is obtained from a prepolymerization reaction of a mixture, the mixture including 100 parts by weight of a compound of Formula (1) and 0.01 to 0.09 part by weight of a Grubbs catalyst. The resin composition may be used to make various articles, including a prepreg, a resin film, a laminate or a printed circuit board, and at least one of the following properties can be improved, including copper foil peeling strength and passive intermodulation.

10 Claims, 1 Drawing Sheet

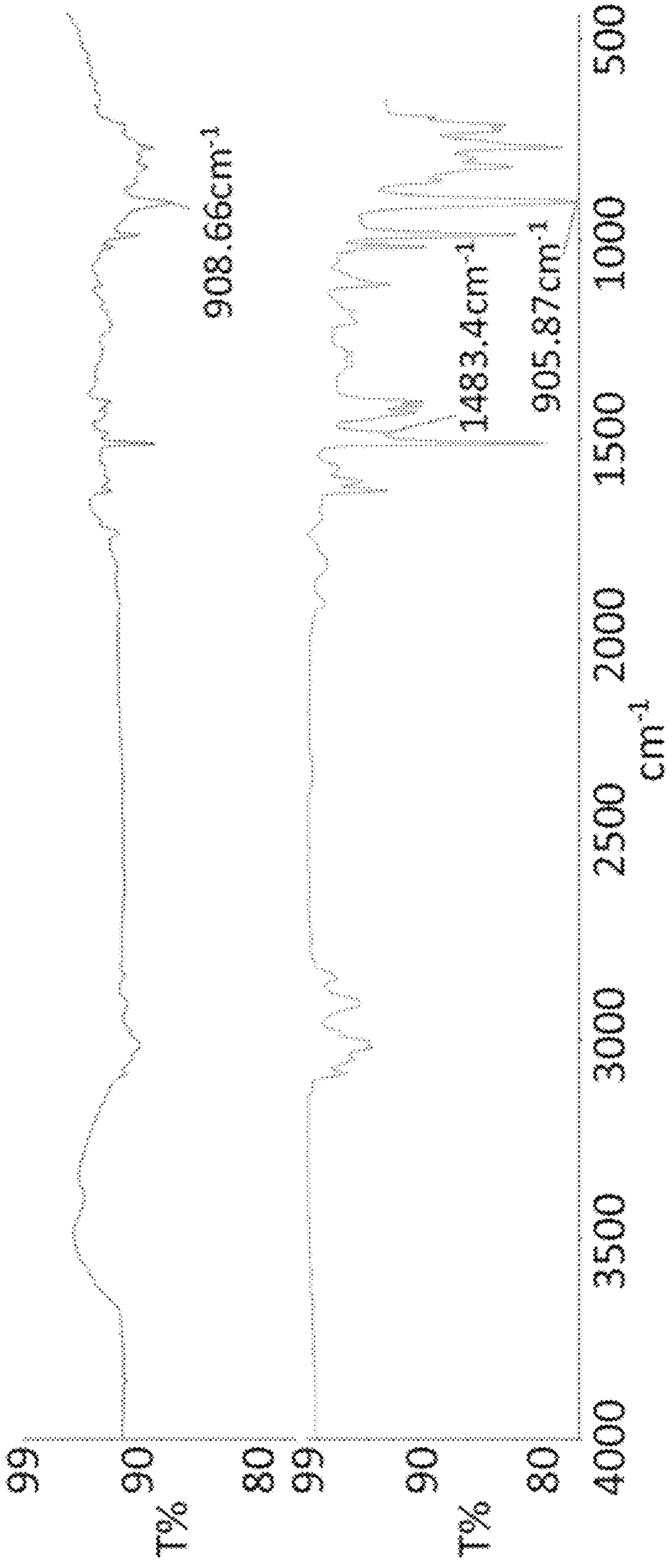
T%
99
90
80
T%
99
90
80
908.66cm-1
1483.4cm-1
905.87cm-1
4000
3500
3000
2500
2000
1500
1000
500
cm-1

PREPOLYMER, RESIN COMPOSITION COMPRISING THE SAME AND ARTICLE MADE THEREFROM

CROSS-REFERENCE TO RELATED APPLICATION

This application claims the priority benefits of U.S. provisional application No. 63/434,239, filed on Dec. 21, 2022. The entirety of the above-mentioned patent application is hereby incorporated by reference herein and made a part of this specification.

BACKGROUND

1. Field of the Disclosure

The present disclosure pertains to the technical field of polymer materials and more particularly to a prepolymer, a resin composition comprising the prepolymer, and an article made from the resin composition.

2. Description of Related Art

With the rapid evolution of electronic technology, materials for various electronic products including mobile communication apparatuses, servers, and cloud storage have been constantly improved. For example, antennas must be ensured to have a minimal passive intermodulation (PIM) when designing and manufacturing, in order to have optimal performance in today's crowded signal environment. Therefore, there is a need for developing materials less prone to signal distortion.

SUMMARY

To overcome the problems of prior arts, particularly the above-mentioned property demands facing conventional materials, it is a primary object of the present disclosure to provide a prepolymer, a resin composition comprising the prepolymer and an article made from the resin composition, which may achieve at least one desirable property improvement including copper foil peeling strength and passive intermodulation.

To achieve the above-mentioned object, the present disclosure provides a prepolymer obtained from a prepolymerization reaction of a mixture, the mixture comprising 100 parts by weight of a compound of Formula (1) and 0.01 to 0.09 part by weight of a Grubbs catalyst, Formula (1)

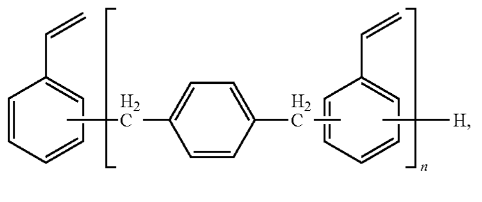

wherein n is 1 to 20.

For example, in one embodiment, the Grubbs catalyst comprises benzylidene·dichloro-bis(tricyclohexylphosphine)ruthenium, benzylidene·[1,3-bis(2,4,6-trimethylphenyl)-2-imidazolidinylidene]·dichloro·(tricyclohexylphosphine)ruthenium, dichloro-(o-isopropoxyphenylmethylene).(tricyclohexylphosphine)ruthenium(II), 1,3-bis(2,4,6-trimethylphenyl)-2-imidazolidinylidene)dichloro(o-isopropoxyphenylmethylene) ruthenium or a combination thereof.

For example, in one embodiment, the prepolymerization reaction is performed in the presence of a solvent at 80° ° C. to 120° C. for 4 to 8 hours, and the prepolymerization reaction has a conversion rate of between 10% and 90%.

In addition, also disclosed herein is a resin composition, which at least comprises the above-described prepolymer.

For example, in one embodiment, the resin composition comprises 100 parts by weight of the prepolymer and 5 to 250 parts by weight of an additive.

For example, in one embodiment, the additive comprises vinyl group-containing polyphenylene ether resin, styrene-butadiene copolymer, polybutadiene, styrene-ethylene/propylene-styrene block copolymer, maleimide resin, 1,2-bis (vinylphenyl) ethane, divinylbenzene-styrene-ethylstyrene terpolymer, ethylene-propylene-5-ethylidene-2-norbornene copolymer or a combination thereof.

For example, in one embodiment, the resin composition further comprises inorganic filler, curing accelerator, flame retardant, polymerization inhibitor, solvent, silane coupling agent, coloring agent, toughening agent or a combination thereof.

For example, in one embodiment, a varnish made from the prepolymer has a gel time of between 200 seconds and 300 seconds.

Moreover, the present disclosure also provides an article made from the aforesaid prepolymer or the resin composition, which comprises a prepreg, a resin film, a laminate or a printed circuit board.

For example, in one embodiment, articles made from the resin composition disclosed herein have one, more or all of the following properties:

- a water absorption ratio of less than or equal to 7%;
- a copper foil peeling strength as measured by reference to IPC-TM-650 2.4.8 of greater than or equal to 3.00 lb/in; and
- a passive intermodulation measured at 1900 MHz of less than or equal to −151 dBc.

BRIEF DESCRIPTION OF THE DRAWINGS

The sole FIGURE illustrates the infrared spectra of the compound of Formula (1) and Prepolymer 1 obtained by its prepolymerization.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "contains," "containing," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or"

refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property. In addition, as used herein, a mixture refers to a combination of two or more compounds.

As used herein, a prepolymer refers to a product, derived from a compound or a mixture (monomer) that is subjected to prepolymerization (partial polymerization), contains unreacted reactive functional groups or has the potential to undergo further polymerization. For example, the progress of the prepolymerization reaction may be confirmed and controlled as needed by determining the molecular weight or the level of viscosity. Prepolymerization reaction disclosed herein may be initiated by the use of solution and heating or by a thermal melting reaction, but not limited thereto. For example, prepolymerization by the use of solution and heating refers to mixing and dissolving the raw materials in a solvent to obtain a solution, optionally adding a catalyst or a polymerization inhibitor in the solution, followed by heating after all components are melted in the solvent, so as to initiate the prepolymerization reaction. Prepolymerization by a thermal melting reaction refers to heating to melt the raw material and at the same time initiate the prepolymerization reaction. The product after prepolymerization (i.e., the prepolymer) has a molecular weight of greater than that of the compound monomer or mixture monomer prior to prepolymerization and may be analyzed by a gel permeation chromatograph (GPC). In the graph of retention time (X-axis) and molecular weight (Y-axis), the distribution peak of molecular weight of the prepolymer is located closer to the Y-axis (shorter retention time), and the distribution peak of molecular weight of the monomer is located behind (longer retention time). In addition, the prepolymer obtained has a wider distribution of molecular weight that contains multiple adjacent peaks, while the monomer has a narrower distribution of molecular weight that contains only one peak.

For example, according to the present disclosure, the prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

As used herein, "vinyl group-containing" refers to the presence of an ethylenic carbon-carbon double bond (C═C) or a functional group derived therefrom in a compound. Therefore, examples of "vinyl" or "vinyl group-containing" may include, but not limited to, a structure containing a vinyl group, an allyl group, a vinylbenzyl group, a methacrylate group or the like. Unless otherwise specified, the position of the aforesaid functional group is not particularly limited and may be located at the terminal of a long-chain structure. Therefore, for example, a vinyl group-containing polyphenylene ether resin represents a polyphenylene ether resin containing a vinyl group, an allyl group, a vinylbenzyl group, a methacrylate group or the like, but not limited thereto.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, an oligomer, etc., but not limited thereto. Unless otherwise specified, according to the present disclosure, the homopolymer refers to a polymer formed by polymerizing one kind of monomer. Unless otherwise specified, according to the present disclosure, the copolymer refers to a product formed by subjecting two or more kinds of monomers to a polymerization reaction. For example, copolymers may comprise: random copolymers, such as a structure of -AABABB-BAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. The copolymer of the present disclosure may be modified, such as by maleic anhydride. The term "polymer" includes but not limited to an oligomer, which is a polymer with 2-20, typically 2-5, repeating units.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

Unless otherwise specified, an alkyl group and an alkenyl group described herein are construed to encompass various isomers thereof. For example, a propyl group is construed to encompass n-propyl and iso-propyl.

As used herein, part(s) by weight represents weight part(s) in any weight unit, such as but not limited to kilogram, gram, pound and so on. For example, 100 parts by weight of the prepolymer may represent 100 kilograms of the prepolymer or 100 pounds of the prepolymer. As used herein, if the amounts of components are presented in a proportional relationship, the actual parts by weight can be any amount that conforms to the proportional relationship.

The following embodiments and examples are illustrative in nature and are not intended to limit the present disclosure and its application. In addition, the present disclosure is not bound by any theory described in the background and summary above or the following embodiments or examples.

As described above, a main object of the present disclosure is to provide a prepolymer obtained from a prepolymerization reaction of a mixture, the mixture comprising 100 parts by weight of a compound of Formula (1) and 0.01 to 0.09 part by weight of a Grubbs catalyst, Formula (1)

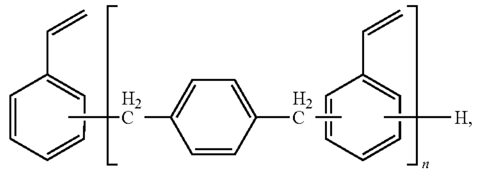

wherein n is 1 to 20.

The conditions of the prepolymerization reaction are not particularly limited and may be adjusted by those skilled in the art without undue experimentation. For example, in one embodiment, the prepolymerization reaction is performed in the presence of a solvent at 80° C. to 120° C. for 4 to 8 hours, and the prepolymerization reaction has a conversion rate of between 10% and 90%.

For example, in one embodiment, the type of the solvent is not particularly limited and may be, for example, toluene, trimethylbenzene, butanone (methyl ethyl ketone), methyl isobutyl ketone, cyclohexanone, xylene, methoxyethyl acetate, ethoxyethyl acetate, propoxyethyl acetate, ethyl acetate, anisole, propylene glycol methyl ether, or a mixture thereof. The amount of the solvent is not particularly limited and may be adjusted according to the solid content required for the prepolymer.

According to the present disclosure, Grubbs catalyst is a ruthenium carbene complex catalyst.

For example, in one embodiment, the Grubbs catalyst may comprise a first-generation Grubbs catalyst, a second-generation Grubbs catalyst, a Hoveyda-Grubbs catalyst, or a combination thereof. For example, in one embodiment, the Grubbs catalyst includes benzylidene-bis(tricyclohexylphosphine)dichlororuthenium (a first-generation Grubbs catalyst, as shown in Formula (2)), benzylidene·[1,3-bis(2,4,6-trimethylphenyl)-2-imidazolidinylidene]·dichloro·(tricyclohexylphosphine) ruthenium (a second-generation Grubbs catalyst, as shown in Formula (3)), dichloro·(o-isopropoxyphenylmethylene)·(tricyclohexylphosphine)ruthenium(II) (a Hoveyda-Grubbs catalyst, as shown in Formula (4)), 1,3-bis(2,4,6-trimethylphenyl)-2-imidazolidinylidene)dichloro(o-isopropoxyphenylmethylene) ruthenium (a Hoveyda-Grubbs catalyst, as shown in Formula (5)) or a combination thereof.

Formula (2)

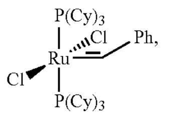

wherein Cy is cyclohexyl group, and Ph is phenyl group;

Formula (3)

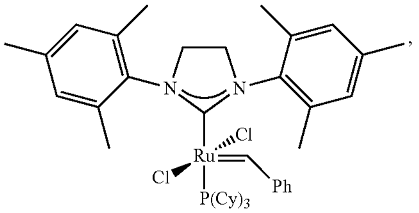

wherein Cy is cyclohexyl group, and Ph is phenyl group;

Formula (4)

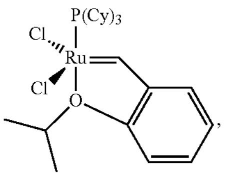

wherein Cy is cyclohexyl group;

Formula (5)

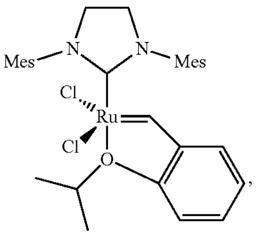

wherein Mes is mesityl group.

For example, in one embodiment, the prepolymerization reaction of the compound of Formula (1) as used herein refers to a conversion rate of the compound of Formula (1) as monomer of greater than 0% and less than 100% (exclusive of 0% and 100%), such as but not limited to a conversion rate of between 10% and 90% (inclusive of 10% and 90%). Existence of some unreacted (e.g., not converted) monomers may increase the compatibility and crosslinking degree of the prepolymer in the resin composition. Specifically, a 0% conversion rate of the monomer represents no reaction of the monomer and therefore fails to form the product from the prepolymerization reaction of the compound of Formula (1). Similarly, a 100% conversion rate of the monomer represents a complete reaction of the monomer and therefore also fails to form the product from the prepolymerization reaction of the compound of Formula (1).

On the other hand, also disclosed herein is a resin composition, comprising the above-described prepolymer.

For example, in one embodiment, the resin composition disclosed herein may comprise the prepolymer and one or more additives. For example, in one embodiment, the amount relationship of the prepolymer and the additive in the resin composition of the present disclosure is not particularly limited and may be adjusted by those skilled in the art without undue experimentation. For example, relative to 100 parts by weight of the prepolymer, the resin composition of the present disclosure may comprise 5 to 250 parts by weight of an additive, such as 5, 10, 15, 20, 30, 40, 50, 80, 100, 150, 200 or 250 parts by weight of an additive, but not limited thereto.

For example, in one embodiment, the additive may include various components used in the art for preparing printed circuit board materials, such as but not limited to vinyl group-containing polyphenylene ether resin, styrene-butadiene copolymer, polybutadiene, styrene-ethylene/propylene-styrene block copolymer, maleimide resin, 1,2-bis (vinylphenyl) ethane, divinylbenzene-styrene-ethylstyrene terpolymer, ethylene-propylene-5-ethylidene-2-norbornene copolymer or a combination thereof.

For example, in one embodiment, the vinyl group-containing polyphenylene ether resin may comprise various polyphenylene ether resins with terminals modified by a vinyl group or an allyl group, such as a vinylbenzyl group-containing polyphenylene ether resin. Alternatively, the vinyl group-containing polyphenylene ether resin may be a (meth)acrylate group-containing polyphenylene ether resin. For example, the vinyl group-containing polyphenylene ether resin comprises a vinylbenzyl group-containing biphenyl polyphenylene ether resin, a methacrylate group-containing polyphenylene ether resin, a vinylbenzyl group-containing bisphenol A polyphenylene ether resin, a chain-extended vinyl group-containing polyphenylene ether resin or a combination thereof, but not limited thereto. Unless otherwise specified, the amount of the vinyl group-containing polyphenylene ether resin is not particularly limited.

For example, in one embodiment, the vinyl group-containing polyphenylene ether resin may comprise various vinyl group-containing polyphenylene ether resins known in the art to which this disclosure pertains. The vinyl group-containing polyphenylene ether resin suitable for the present disclosure is not particularly limited and may comprise any one or more commercially available products, self-prepared products, or a combination thereof. In some embodiments, any one or more of the following vinyl group-containing polyphenylene ether resins may be used: a vinylbenzyl group-containing biphenyl polyphenylene ether resin (e.g., OPE-2st, available from Mitsubishi Gas Chemical Co., Inc.), a methacrylate group-containing polyphenylene ether resin (e.g., SA9000, available from Sabic), a vinylbenzyl group-containing bisphenol A polyphenylene ether resin, a chain-extended vinyl group-containing polyphenylene ether resin or a combination thereof. The chain-extended vinyl group-containing polyphenylene ether resin may include various polyphenylene ether resins disclosed in the US Patent Application Publication No. 2016/0185904 A1, all of which are incorporated herein by reference in their entirety.

For example, in one embodiment, a styrene-butadiene copolymer refers to the product formed only by styrene and butadiene monomers; a styrene-butadiene copolymer comprises, such as but not limited to, a styrene-butadiene random copolymer, a styrene-butadiene alternating copolymer, a styrene-butadiene graft copolymer or a styrene-butadiene block copolymer. A styrene-butadiene block copolymer comprises, such as but not limited to, a polymerized molecular structure of styrene-styrene-styrene-butadiene-butadiene-butadiene-butadiene. A styrene-butadiene block copolymer comprises, such as but not limited to, a styrene-butadiene-styrene block copolymer. A styrene-butadiene-styrene block copolymer comprises, such as but not limited to, a polymerized molecular structure of styrene-styrene-styrene-butadiene-butadiene-butadiene-butadiene-styrene-styrene-styrene. Similarly, a hydrogenated styrene-butadiene copolymer comprises a hydrogenated styrene-butadiene random copolymer, a hydrogenated styrene-butadiene alternating copolymer, a hydrogenated styrene-butadiene graft copolymer or a hydrogenated styrene-butadiene block copolymer. A hydrogenated styrene-butadiene block copolymer comprises, such as but not limited to, a hydrogenated styrene-butadiene-styrene block copolymer. Unless otherwise specified, the amount of the styrene-butadiene copolymer is not particularly limited.

For example, in one embodiment, the styrene-ethylene/propylene-styrene block copolymer may include product names Septon 2002, Septon 2004F, Septon 2005, Septon 2006, Septon 2063 and Septon 2104, all available from Kuraray. Unless otherwise specified, the amount of the styrene-ethylene/propylene-styrene block copolymer is not particularly limited.

For example, in one embodiment, unless otherwise specified, the maleimide resin used herein refers to a compound or a mixture containing at least one maleimide group. The maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide containing a biphenyl structure, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. These components should be construed as including their modifications. Unless otherwise specified, the amount of the maleimide resin is not particularly limited.

For example, the maleimide resin includes but is not limited to products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000, and BMI-7000H available from Daiwakasei Industry, products such as BMI-70 and BMI-80 available from K.I Chemical Industry Co., Ltd., or products such as MIR-3000 and MIR-5000 available from Nippon Kayaku.

For example, the maleimide resin containing aliphatic long chain structure may include products such as but not limited to BMI-689, BMI-1400, BMI-1500, BMI-1700, BMI-2500, BMI-3000, BMI-5000 and BMI-6000 available from Designer Molecules Inc.

In addition to the aforesaid components, the resin composition may also optionally comprise: inorganic filler, curing accelerator, flame retardant, polymerization inhibitor, solvent, silane coupling agent, coloring agent, toughening agent or a combination thereof, but not limited thereto.

For example, the inorganic filler may be any one or more inorganic fillers used for preparing a prepreg, a resin film, a laminate or a printed circuit board; examples of the inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, flake-like or whisker-like in shape and can be optionally pretreated by a silane coupling agent. Unless otherwise specified, the amount of the inorganic filler is not particularly limited and may for example range from 0 part by weight to 300 parts by weight of the inorganic filler relative to 100 parts by weight of the prepolymer.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof. Unless otherwise specified, the amount of the curing accelerator is not particularly limited and may for example range from 0.1 part by weight to 2 parts by weight of the curing accelerator relative to 100 parts by weight of the prepolymer.

For example, the flame retardant used herein may be any one or more flame retardants useful for preparing a prepreg, a resin film, a laminate or a printed circuit board, examples including but not limited to a phosphorus-containing flame retardant, preferably comprising ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phosphaphenanthrene-10-oxide) and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935), or a combination thereof.

For example, the flame retardant may be a DPPO compound (e.g., di-DPPO compound, such as commercially available PQ-60), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a DOPO-containing bisphenol novolac compound, such as DOPO-BPAN (DOPO-bisphenol A novolac), DOPO-BPFN (DOPO-bisphenol F novolac) or DOPO-BPSN (DOPO-bisphenol S novolac). Unless otherwise specified, the amount of the flame retardant is not particularly limited.

For example, the polymerization inhibitor may comprise, but not limited to, 1,1-diphenyl-2-picrylhydrazyl radical, methyl acrylonitrile, 2,2,6,6-tetramethyl-1-oxo-piperidine, dithioester, nitroxide-mediated radical, triphenylmethyl radical, metal ion radical, sulfur radical, hydroquinone, 4-methoxyphenol, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butyl phenol) or a combination thereof. For example, the nitroxide-mediated radical may comprise, but not limited to, nitroxide radicals derived from cyclic hydroxylamines, such as 2,2,6,6-substituted piperidine 1-oxyl free radical, 2,2,5,5-substituted pyrrolidine 1-oxyl free radical or the like. Preferred substitutes include alkyl groups with 4 or fewer carbon atoms, such as methyl group or ethyl group. Examples of the compound containing a nitroxide radical include but are not limited to 2,2,6,6-tetramethylpiperidine 1-oxyl free radical, 2,2,6,6-tetraethylpiperidine 1-oxyl free radical, 2,2,6,6-tetramethyl-4-oxo-piperidine 1-oxyl free radical, 2,2,5,5-tetramethyl pyrrolidine 1-oxyl free radical, 1,1,3,3-tetramethyl-2-isoindoline oxygen radical, N,N-di-tert-butylamine oxygen free radical and so on. Nitroxide radicals may also be replaced by using stable radicals such as galvinoxyl radicals. The polymerization inhibitor suitable for the resin composition of the present disclosure may include products derived from the polymerization inhibitor with its hydrogen atom or group substituted by other atom or group. Examples include products derived from a polymerization inhibitor with its hydrogen atom substituted by an amino group, a hydroxyl group, a carbonyl group or the like.

For example, the solvent is not particularly limited and may be any solvent suitable for dissolving the resin composition disclosed herein, example including, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof. The amount of the solvent is not particularly limited and may be adjusted according to the viscosity required for the resin composition.

For example, the silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane. The amount of the silane coupling agent is not particularly limited and may be adjusted according to the dispersivity of inorganic filler used in the resin composition.

For example, the coloring agent may comprise but not limited to dye or pigment.

As used herein, the purpose of adding toughening agent is to improve the toughness of the resin composition. For example, the toughening agent may comprise, but not limited to, carboxyl-terminated butadiene acrylonitrile rubber (CTBN rubber), core-shell rubber, or a combination thereof.

The resin composition of various embodiments may be processed to make different articles, such as those suitable for use as components in electronic products, including but not limited to a prepreg, a resin film, a laminate or a printed circuit board.

For example, the resin compositions of various embodiments may be used to make prepregs.

For example, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 60° C. to 120° C. The reinforcement material may be a fiber material or a non-fiber material, configured as any one of woven fabric and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

For example, the article made from the resin composition disclosed herein may be a resin film.

For example, in one embodiment, the resin film disclosed herein is prepared by heating and baking the resin composition to the semi-cured state (B-stage). For example, the resin composition may be selectively coated on a liquid crystal polymer film, a polyethylene terephthalate film (PET film) or a polyimide film; for example, the resin composition from each embodiment may be coated on a copper foil to uniformly adhere the resin composition thereon, followed by heating and baking at 60° C. to 120° C. for 3 to 10 minutes to a semi-cured state to form a resin film, so as to obtain a copper-clad resin film (i.e., resin-coated copper).

For example, the resin compositions of various embodiments may be used to make laminates.

For example, in one embodiment, the laminate of the present disclosure comprises at least two metal foils and an insulation layer disposed between the metal foils, wherein the insulation layer is made by curing the resin composition at high temperature and high pressure to the C-stage, a suitable curing temperature being for example between 180° C. and 240° C. and preferably between 200° C. and 220° C. and a suitable curing time being 60 to 150 minutes and preferably 90 to 120 minutes. The insulation layer may be formed by curing the aforesaid prepreg or resin film to the C-stage. The metal foil may comprise copper, aluminum, nickel, platinum, silver, gold or alloy thereof, such as a copper foil. In one embodiment, the laminate is a copper-clad laminate (CCL).

In addition, the laminate may be further processed by trace formation processes to make a circuit board, such as a printed circuit board.

In one embodiment of making the printed circuit board according to the present disclosure, a double-sided copper-clad laminate (such as product EM-891, available from Elite Material Co., Ltd.) with a thickness of 28 mil and having 0.5-ounce (oz) HVLP (hyper very low profile) copper foils may be used and subjected to the following steps: 1. Drilling and then electroplating, so as to form electrical conduction between the top layer copper foil and the bottom layer copper foil; 2. Then the top layer copper foil and the bottom layer copper foil are etched to form inner layer circuits; 3. Then brown oxidation and roughening are performed on the inner layer circuits to form uneven structures on the surface to increase roughness; 4. Next, a vacuum lamination apparatus is used to laminate the assembly of a copper foil, the prepreg, the inner layer circuits, the prepreg and a copper foil stacked in said order by heating at 190° C. to 220° C. for 90 to 200 minutes to cure the insulation material of the prepregs. The number of times to repeat the above steps 1 to 4 is determined according to the need of the terminal product, so as to finally obtain the required printed circuit board.

In one embodiment, the prepolymer disclosed herein, the resin composition comprising the prepolymer or an article made therefrom may achieve improvement in one or more of the following properties including gel time, water absorption ratio, copper foil peeling strength and passive intermodulation.

For example, in one embodiment, the prepolymer disclosed herein, the resin composition containing the prepolymer or an article made therefrom has one, more or all of the following properties:

- a gel time of varnish made from the prepolymer of between 200 seconds and 300 seconds, such as between 200 seconds and 250 seconds or between 250 seconds and 300 seconds;
- a water absorption ratio of less than or equal to 7%, such as between 0% and 7%, such as about 6%, 5%, 4%, 3%, 2% or 1%;
- a copper foil peeling strength as measured by reference to IPC-TM-650 2.4.8 of greater than or equal to 3.00 lb/in, such as between 3.00 lb/in and 3.21 lb/in; and
- a passive intermodulation measured at 1900 MHz of less than or equal to −151 dBc, such as between −165 dBc and −151 dBc.

Methods for measuring the aforesaid properties will be elaborated in detail below.

Chemical reagents used in Examples and Comparative Examples of resin composition disclosed herein and chemical reagents used in Preparation Examples and Synthesis Examples are listed below:

- Prepolymer 1 to Prepolymer 7: as described in Synthesis Example 1 to Synthesis Example 7.
- Compound of Formula (1): as described in Preparation Example 1.
- Grubbs catalyst: benzylidene[1,3-bis(2,4,6-trimethylphenyl)-2-imidazolidinylidene]dichloro(tricyclohexylphosphine)ruthenium, available from SIGMA-ALDRICH.
- DCP: dicumyl peroxide, available from NOF Corporation.
- BPO: dibenzoyl peroxide, available from Emperor Chemical Co., Ltd.
- DCPD: dicyclopentadiene, available from SIGMA-ALDRICH.
- OPE-2st 2200: vinylbenzyl group-containing polyphenylene ether resin, available from Mitsubishi Gas Chemical Co., Inc.
- SA9000: methacrylate group-containing polyphenylene ether resin, available from Sabic.
- Ricon 100: styrene-butadiene copolymer, available from Cray Valley.
- B-1000: polybutadiene, available from Nippon Soda Co., Ltd.
- Septon2104: styrene-ethylene/propylene-styrene block copolymer, available from Kuraray.
- BMI-70: 3,3'-dimethyl-5,5'-diethyl-4,4'-diphenylmethane bismaleimide, available from K.I Chemical Industry Co., Ltd.
- BVPE: 1,2-bis(vinylphenyl)ethane, available from Linchuan Chemical Co., Ltd.
- Divinylbenzene-styrene-ethylstyrene terpolymer: as described in Preparation Example 2.
- EPT™ X-3012P: ethylene-propylene-5-ethylidene-2-norbornene copolymer, available from Mitsui Chemicals.
- SC2050 SMJ: chemically synthesized silica, surface treated by methacrylate siloxane, available from Admatechs.
- 25B: 2,5-dimethyl-2,5-di(tert-butylperoxy)-3-hexyne, available from NOF Corporation.
- Toluene: commercially available.

Preparation Example 1

296 parts by weight of 2-bromoethylbenzene (manufactured by Tokyo Chemical Industry Co., Ltd.), 70 parts by weight of α,α'-dichloro-p-xylene (manufactured by Tokyo Chemical Industry Co., Ltd.) and 18.4 parts by weight of methanesulfonic acid (manufactured by Tokyo Chemical Industry Co., Ltd.) were reacted at 130° C. for 8 hours, followed by cooled to room temperature, neutralized with aqueous sodium hydroxide solution, and extracted with 1200 parts by weight of toluene. The organic layer was washed with water. The solvent and excess 2-bromoethylbenzene were removed by distillation under heating and reduced pressure to obtain the intermediate. The molar ratio of 2-bromoethylbenzene to α,α'-dichloro-p-xylene may be 4:1; methanesulfonic acid was used as an acidic catalyst and may be replaced by other acidic catalyst such as hydrochloric acid and phosphoric acid; and the reaction conditions may be 40 to 180° C. for 0.5 to 20 hours.

22 parts by weight of the aforesaid intermediate, 50 parts by weight of toluene (other aromatic solvents may also be used, such as xylene), 150 parts by weight of dimethyl sulfoxide (other aprotic polar solvents may also be used, such as dimethyl sulfone), 15 parts by weight of water and 5.4 parts by weight of sodium hydroxide (other alkaline catalysts may also be used, such as potassium hydroxide and potassium carbonate) were reacted at 40° C. for 5 hours, followed by cooled to room temperature, and then added with 100 parts by weight of toluene. The organic layer was washed with water, and the solvent was removed by distillation under heating and reduced pressure to obtain the compound of Formula (1).

Preparation Example 2

100 parts by weight of toluene solvent, 60 parts by weight of 1,4-divinylbenzene (available from Merck), 30 parts by weight of styrene and 40 parts by weight of 4-ethylstyrene (available from Alfa Chemistry) were added to a three-necked flask and stirred to dissolve completely, followed by adding 2.0 parts by weight of tetrabutylammonium and 1.0 part by weight of stannic chloride. The reaction was performed under stirring at 100° C. for 3 hours. After the reaction was completed, steps including filtration, purification, methanol precipitation and cooling were performed to obtain a solid divinylbenzene-styrene-ethylstyrene terpolymer.

Synthesis Example 1

100 parts by weight of a compound of Formula (1) and 0.05 part by weight of a Grubbs catalyst were added to a three-necked flask, followed by adding 100 parts by weight of toluene to the three-necked flask, and the reaction was continuously stirred to obtain a mixture solution. The mixture solution was heated from room temperature to 90° C. and continuously stirred for 6 hours, followed by cooled down to room temperature. After filtration for removing partial solvent and impurities, Prepolymer 1 solution with a solid content of about 60% was obtained, which is the prepolymer according to the present disclosure.

The sole FIGURE illustrates the infrared spectra of the compound of Formula (1) and Prepolymer 1 obtained by its prepolymerization. It can be found from the upper infrared spectrum that the compound of Formula (1) has a vinyl characteristic peak at 908.66 cm-1. From the infrared spectrum below, it can be found that Prepolymer 1 still has a vinyl characteristic peak at 905.87 $cm^{-1}$, which means that the conversion rate of the prepolymerization reaction is greater than 0% and less than 100% (a 0% conversion rate represents absence of a prepolymerization reaction, and a 100% conversion rate represents that no reactive vinyl group remains). In addition, Prepolymer 1 has a characteristic peak of methylene group at 1483.4 $cm^{-1}$, representing that the reactive vinyl group of the compound of Formula (1) participates in the reaction.

Synthesis Example 2

Substantially the same as Synthesis Example 1, except that 0.01 part by weight of a Grubbs catalyst was added to obtain Prepolymer 2 solution after synthesis, which is the prepolymer according to the present disclosure.

Synthesis Example 3

Substantially the same as Synthesis Example 1, except that 0.09 part by weight of a Grubbs catalyst was added to obtain Prepolymer 3 solution after synthesis, which is the prepolymer according to the present disclosure.

Synthesis Example 4

Substantially the same as Synthesis Example 1, except that 0.01 part by weight of DCP instead of a Grubbs catalyst was added to obtain Prepolymer 4 solution after synthesis.

Synthesis Example 5

Substantially the same as Synthesis Example 1, except that 0.01 part by weight of BPO instead of a Grubbs catalyst was added to obtain Prepolymer 5 solution after synthesis.

Synthesis Example 6

40 parts by weight of DCPD, 60 parts by weight of OPE-2st 2200 and 0.01 part by weight of a Grubbs catalyst were added to a three-necked flask, followed by adding 100 parts by weight of toluene to the three-necked flask, and the reaction was continuously stirred to obtain a mixture solution. The mixture solution was heated from room temperature to 90° C. and continuously stirred for 6 hours, followed by cooled down to room temperature. After filtration for removing partial solvent and impurities, Prepolymer 6 solution was obtained.

Synthesis Example 7

100 parts by weight of DCPD and 0.01 part by weight of a Grubbs catalyst were added to a three-necked flask, followed by adding 100 parts by weight of toluene to the three-necked flask, and the reaction was continuously stirred to obtain a mixture solution. The mixture solution was heated from room temperature to 90° C. and continuously stirred for 6 hours, followed by cooled down to room temperature. After filtration for removing partial solvent and impurities, Prepolymer 7 solution was obtained.

The raw materials and the amount thereof used in Synthesis Example 1 to Synthesis Example 7 are shown in the following Table 1:

TABLE 1

The raw materials and the amount thereof used in Synthesis Example 1 to Synthesis Example 7 (in part by weight)

| Raw material | compound of Formula (1) | Grubbs catalyst | DCP | BPO | DCPD | OPE-2st 2200 |
|---|---|---|---|---|---|---|
| Synthesis Example 1 | 100 | 0.05 | | | | |
| Synthesis Example 2 | 100 | 0.01 | | | | |
| Synthesis Example 3 | 100 | 0.09 | | | | |
| Synthesis Example 4 | 100 | | 0.01 | | | |
| Synthesis Example 5 | 100 | | | 0.01 | | |
| Synthesis Example 6 | | 0.01 | | | 40 | 60 |
| Synthesis Example 7 | | 0.01 | | | 100 | |

In addition, the resin compositions of various Examples and Comparative Examples of the present disclosure were prepared respectively according to the amount listed in Table 2 to Table 4 and further fabricated to prepare test samples.

TABLE 2

Resin compositions of Examples (in part by weight) and test results

| Component | Name | E1 | E2 | E3 | E4 | E5 | E6 | E7 |
|---|---|---|---|---|---|---|---|---|
| prepolymer | Prepolymer 1 | 100 | | | 100 | 100 | 100 | 100 |
| | Prepolymer 2 | | 100 | | | | | |
| | Prepolymer 3 | | | 100 | | | | |
| | Prepolymer 4 | | | | | | | |

TABLE 2-continued

Resin compositions of Examples (in part by weight) and test results

| | | | | | | | | |
|---|---|---|---|---|---|---|---|---|
| | Prepolymer 5 | | | | | | | |
| | Prepolymer 6 | | | | | | | |
| | Prepolymer 7 | | | | | | | |
| compound of Formula (1) | | | | | | | | |
| additive | SA9000 | | | | 100 | | | |
| | OPE-2st 2200 | | | | | | | |
| | Ricon100 | | | | | 100 | | |
| | B-1000 | | | | | | 100 | |
| | Septon2104 | | | | | | | 100 |
| | BMI-70 | | | | | | | |
| | BVPE | | | | | | | |
| | divinylbenzene-styrene-ethylstyrene terpolymer | | | | | | | |
| | EPT ™ X-3012P | | | | | | | |
| inorganic filler | SC2050 SMJ | 100 | 100 | 100 | 100 | 100 | 100 | 100 |
| catalyst | Grubbs catalyst | | | | | | | |
| | 25B | 1 | 1 | 1 | 1 | 1 | 1 | 1 |
| solvent | toluene | 120 | 120 | 120 | 120 | 120 | 120 | 120 |
| Property | Unit | E1 | E2 | E3 | E4 | E5 | E6 | E7 |
| copper foil peeling strength | lb/in | 3.13 | 3.14 | 3.12 | 3.21 | 3.07 | 3.02 | 3.00 |
| passive intermodulation | dBc | −159 | −158 | −160 | −158 | −159 | −161 | −162 |

TABLE 3

Resin compositions of Examples (in part by weight) and test results

| Component | Name | E8 | E9 | E10 | E11 | E12 | E13 |
|---|---|---|---|---|---|---|---|
| prepolymer | Prepolymer 1 | 100 | 100 | 100 | 100 | 100 | 100 |
| | Prepolymer 2 | | | | | | |
| | Prepolymer 3 | | | | | | |
| | Prepolymer 4 | | | | | | |
| | Prepolymer 5 | | | | | | |
| | Prepolymer 6 | | | | | | |
| | Prepolymer 7 | | | | | | |
| compound of Formula (1) | | | | | | | |
| additive | SA9000 | | | | | 25 | |
| | OPE-2st 2200 | | | | | 10 | |
| | Ricon100 | | | | | | 70 |
| | B-1000 | | | | | | 100 |
| | Septon2104 | | | | | 25 | |
| | BMI-70 | 100 | | | | | 45 |
| | BVPE | | | | | 10 | |
| | divinylbenzene-styrene-ethylstyrene terpolymer | | | | | 10 | 25 |
| | EPT ™ X-3012P | | | | | 5 | 10 |
| inorganic filler | SC2050 SMJ | 100 | 0 | 30 | 130 | 100 | 100 |
| catalyst | Grubbs catalyst | | | | | | |
| | 25B | 1 | 1 | 1 | 1 | 0.5 | 2 |
| solvent | toluene | 120 | 120 | 120 | 120 | 80 | 150 |
| Property | Unit | E8 | E9 | E10 | E11 | E12 | E13 |
| copper foil peeling strength | lb/in | 3.19 | 3.01 | 3.06 | 3.05 | 3.11 | 3.05 |
| passive intermodulation | dBc | −151 | −161 | −159 | −158 | −163 | −165 |

TABLE 4

Resin compositions of Comparative Examples (in part by weight) and test results

| Component | Name | C1 | C2 | C3 | C4 | C5 | C6 | C7 |
|---|---|---|---|---|---|---|---|---|
| prepolymer | Prepolymer 1 | | | | | | | |
| | Prepolymer 2 | | | | | | | |
| | Prepolymer 3 | | | | | | | |
| | Prepolymer 4 | 100 | | | | | | |
| | Prepolymer 5 | | 100 | | | | | |

TABLE 4-continued

| Resin compositions of Comparative Examples (in part by weight) and test results | | | | | | | | |
|---|---|---|---|---|---|---|---|---|
| | Prepolymer 6 | | | 100 | | | | |
| | Prepolymer 7 | | | | 100 | | | |
| compound of Formula (1) | | | | | | 100 | 100 | 100 |
| additive | SA9000 | | | | | | 100 | |
| | OPE-2st 2200 | | | | | | | |
| | Ricon100 | | | | | | | 100 |
| | B-1000 | | | | | | | |
| | Septon2104 | | | | | | | |
| | BMI-70 | | | | | | | |
| | BVPE | | | | | | | |
| | divinylbenzene-styrene-ethylstyrene terpolymer | | | | | | | |
| | EPT ™ X-3012P | | | | | | | |
| inorganic filler | SC2050 SMJ | 100 | 100 | 100 | 100 | 100 | 100 | 100 |
| catalyst | Grubbs catalyst | | | | | 0.01 | 0.01 | 0.01 |
| | 25B | 1 | 1 | 1 | 1 | 1 | 1 | 1 |
| solvent | toluene | 120 | 120 | 120 | 120 | 120 | 120 | 120 |
| Property | Unit | C1 | C2 | C3 | C4 | C5 | C6 | C7 |
| copper foil peeling strength | lb/in | 2.18 | 1.95 | 2.77 | 2.24 | 2.13 | 2.82 | 2.05 |
| passive intermodulation | dBc | −140 | −145 | −144 | −140 | −145 | −145 | −145 |

Samples (specimens) for the properties measured above were prepared as described below and tested and analyzed under specified conditions below.

1. Prepreg (PP)

Resin composition (in part by weight) from each Example or each Comparative Example was separately added to a stirred tank and well-mixed to form a varnish. Then the varnish was loaded to an impregnation tank, and a fiberglass fabric (e.g., 1078 L-glass fiber fabric, available from Asahi) was impregnated into the impregnation tank to adhere the resin composition onto the fiberglass fabric, followed by heating at 60° C. to 120° C. to the semi-cured state (B-stage) to obtain a prepreg, having a resin content of about 70%.

2. Copper-Containing Laminate 1 (Obtained by Laminating Six Prepregs)

Two 0.5 oz hyper very low profile 3 (HVLP3) copper foils and six prepregs described above were prepared and stacked in the order of one copper foil, six prepregs and one copper foil, followed by lamination under vacuum with a lamination pressure of 250 psi to 600 psi at 200° ° C. to 220° C. for 90 minutes to 120 minutes so as to obtain the copper-containing laminate 1 (obtained by laminating six prepregs). Insulation layers were formed by laminating to cure the six sheets of prepreg between the two copper foils, and the resin content of the insulation layers is about 70%.

3. Copper-Containing Laminate 2 (Obtained by Laminating Fifteen Prepregs)

Two 0.5 oz hyper very low profile 3 (HVLP3) copper foils and fifteen prepregs described above were prepared and stacked in the order of one copper foil, fifteen prepregs and one copper foil, followed by lamination under vacuum with a lamination pressure of 250 psi to 600 psi at 200° C. to 220° C. for 90 minutes to 120 minutes so as to obtain the copper-containing laminate 2 (obtained by laminating fifteen prepregs). Insulation layers were formed by laminating to cure the fifteen sheets of prepreg between the two copper foils, and the resin content of the insulation layers is about 70%.

4. Copper-Free Laminate (Obtained by Laminating Eight Prepregs)

The varnish prepared in the following gel time test was loaded to an impregnation tank, and a fiberglass fabric (e.g., 1078 L-glass fiber fabric, available from Asahi) was impregnated into the impregnation tank to adhere the resin composition onto the fiberglass fabric, followed by heating at 60° C. to 120° C. to the semi-cured state (B-stage) to obtain a prepreg, having a resin content of about 70%. Two 0.5 oz hyper very low profile 3 (HVLP3) copper foils and eight prepregs described above were prepared and stacked in the order of one copper foil, eight prepregs and one copper foil, followed by lamination under vacuum with a lamination pressure of 250 psi to 600 psi at 200° C. to 220° C. for 90 minutes to 120 minutes so as to obtain a copper-containing laminate (obtained by laminating eight prepregs). Each copper-containing laminate made by laminating eight prepregs obtained above was etched to remove the copper foils on both sides so as to obtain the copper-free laminate (obtained by laminating eight prepregs).

Test items and test methods are described below.

Gel Time (SG)

The prepolymer prepared in the aforementioned Synthesis Examples, such as Prepolymer 1, Prepolymer 2, Prepolymer 3, Prepolymer 4, Prepolymer 5, Prepolymer 6 or Prepolymer 7, was respectively dissolved in solvent to prepare a varnish. 0.2 gram of the varnish was taken and placed at the center of a 161° C. hot plate for 60 seconds and then smeared as a circle with a diameter of about 1 cm; after the varnish clotted and could be pulled up from the hot plate, the duration was recorded and designated as gel time (in second). Generally, a gel time of 200 seconds to 300 seconds at 161° ° C. represents that a varnish has better operability. The measurement result of gel time is shown in Table 5.

Water Absorption Ratio

By reference to IPC-TM-650 2.6.2.1a, a 2 inch*2 inch copper-free laminate (obtained by laminating eight prepregs) was placed in a 105±10° C. oven and baked for 1 hour, then cooled at room temperature (about 25° C.) for 10 minutes and weighed to give a weight value W1 representing the weight of the copper-free laminate (obtained by laminating eight prepregs). The laminate sample was immersed and soaked in pure water at room temperature for 24 hours, then removed from the pure water and wiped to remove residual water on the surface, and the sample was weighed to give a weight value W2. The water absorption ratio was calculated as follows: Water absorption ratio (%)=((W2-W1)/W1)*100%. In the technical field to which the present disclosure pertains, lower water absorption ratio is better. For example, a water absorption ratio of less than or equal to 7% represents that the sample has a good property of water absorption ratio. The measurement result of water absorption ratio is also shown in Table 5.

TABLE 5

The measurement results of gel time and water absorption ratio

| Composition and amount (part by weight) | 100 parts by weight of Prepolymer 1 + 50 parts by weight of toluene | 100 parts by weight of Prepolymer 2 + 50 parts by weight of toluene | 100 parts by weight of Prepolymer 3 + 50 parts by weight of toluene | 100 parts by weight of Prepolymer 4 + 50 parts by weight of toluene | 100 parts by weight of Prepolymer 5 + 50 parts by weight of toluene | 100 parts by weight of Prepolymer 6 + 50 parts by weight of toluene | 100 parts by weight of Prepolymer 7 + 50 parts by weight of toluene |
|---|---|---|---|---|---|---|---|
| gel time (second) | 240 | 245 | 234 | 110 | 134 | 350 | >600 |
| water absorption ratio (%) | 5 | 3 | 7 | 13 | 12 | 14 | 10 |

Copper foil peeling strength (0.5 oz peeling strength, 0.5 oz P/S)

A copper-containing laminate 1 (obtained by laminating six prepregs) was cut into a rectangular sample with a width of 24 mm and a length of 80 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the 0.5-ounce (half-ounce) copper foil peeling strength (0.5 oz P/S, in lb/in). In the technical field to which the present disclosure pertains, higher copper foil peeling strength is better. Generally, samples with a resin content of about 70% having a difference in copper foil peeling strength (0.5-ounce) of greater than or equal to 0.3 lb/in represents a substantial difference (i.e., significant technical difficulty) in copper foil peeling strength in different samples.

Passive Intermodulation (PIM)

Three copper-containing laminate 2 (obtained by laminating fifteen prepregs) samples were prepared to make three intermodulation models according to the procedures below. Arc and zigzag circuits (not limited to arc and zigzag, but including straight or any other shapes) with a length of 12 inches (not limited to 12 inches) were designed, with a thickness of 60 mils, a circuit impedance of 50 ohms and a corresponding circuit width of 140 mils. At a frequency of 1900 MHZ, by using a model IBA-1291B passive intermodulation measurement instrument, each intermodulation model was tested for 10 times respectively and the average was taken to obtain the passive intermodulation. Generally, samples having a difference in passive intermodulation of greater than or equal to 5 dBc represents a substantial difference (i.e., significant technical difficulty) in passive intermodulation in different samples.

The following observations can be made according to the test results above.

Using a varnish made from the prepolymer of the present disclosure (such as using a varnish made from Prepolymer 1, Prepolymer 2 or Prepolymer 3), in contrast to using a varnish made from a prepolymer other than that of the present disclosure (such as using a varnish made from Prepolymer 4, Prepolymer 5, Prepolymer 6 or Prepolymer 7), may achieve more desirable results in the property measurements including gel time and water absorption ratio.

If the resin composition, such as Comparative Examples C1-C4, does not contain the prepolymer of the present disclosure, but contains a prepolymer made from different materials, it will fail to achieve desirable improvement in at least one of the properties including copper foil peeling strength and passive intermodulation.

If the resin composition, such as Comparative Examples C5-C7, does not contain the prepolymer of the present disclosure, but contains the compound of Formula (1) and a Grubbs catalyst without performing a prepolymerization reaction in advance, it will fail to achieve desirable improvement in at least one of the properties including copper foil peeling strength and passive intermodulation.

In contrast, the resin composition of the present disclosure, such as Examples E1-E13, can achieve at the same time desirable properties including a copper foil peeling strength of greater than or equal to 3.00 lb/in and a passive intermodulation at 1900 MHz of less than or equal to −151 dBc. Moreover, a varnish made from the prepolymer has a gel time of between 200 seconds and 300 seconds, and an article made therefrom has a water absorption ratio of less than or equal to 7%.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A prepolymer obtained from a prepolymerization reaction of a mixture, the mixture comprising 100 parts by weight of a compound of Formula (1) and 0.01 to 0.09 part by weight of a Grubbs catalyst, Formula (1)

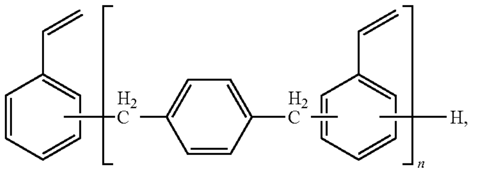

wherein n is 1 to 20.

2. The prepolymer of claim 1, wherein the Grubbs catalyst comprises benzylidene-bis(tricyclohexylphosphine)dichlororuthenium, benzylidene·[1,3-bis(2,4,6-trimethylphenyl)-2-imidazolidinylidene]·dichloro·(tricyclohexylphosphine) ruthenium, dichloro-(o-isopropoxyphenylmethylene)·(tricyclohexylphosphine)ruthenium(II), 1,3-bis(2,4,6-trimethylphenyl)-2-imidazolidinylidene)dichloro(o-isopropoxyphenylmethylene) ruthenium or a combination thereof.

3. The prepolymer of claim 1, wherein the prepolymerization reaction is performed in the presence of a solvent at 80° C. to 120° C. for 4 to 8 hours, and the prepolymerization reaction has a conversion rate of between 10% and 90%.

4. A resin composition comprising the prepolymer of claim 1.

5. The resin composition of claim 4, comprising 100 parts by weight of the prepolymer and 5 to 250 parts by weight of an additive.

6. The resin composition of claim 5, wherein the additive comprises vinyl group-containing polyphenylene ether resin, styrene-butadiene copolymer, polybutadiene, styrene-ethylene/propylene-styrene block copolymer, maleimide resin, 1,2-bis(vinylphenyl) ethane, divinylbenzene-styrene-ethylstyrene terpolymer, ethylene-propylene-5-ethylidene-2-norbornene copolymer or a combination thereof.

7. The resin composition of claim 4, further comprising inorganic filler, curing accelerator, flame retardant, polymerization inhibitor, solvent, silane coupling agent, coloring agent, toughening agent or a combination thereof.

8. An article made from the resin composition of claim 4, comprising a prepreg, a resin film, a laminate or a printed circuit board.

9. The article of claim 8, having a copper foil peeling strength as measured by reference to IPC-TM-650 2.4.8 of greater than or equal to 3.00 lb/in.

10. The article of claim 8, having a passive intermodulation measured at 1900 MHz of less than or equal to −151 dBc.

* * * * *